(12) United States Patent
Flieder (10) Patent No.: US 10,366,638 B2
(45) Date of Patent: Jul. 30, 2019

(54) HYBRID PHOTOLUMINESCENT LIGHTING DISPLAY

(71) Applicant: ISOLITE CORPORATION, Berwyn, PA (US)

(72) Inventor: Robert Flieder, Hamilton, NJ (US)

(73) Assignee: H-3 GROUP, INC., Berwyn, PA (US)

( * ) Notice: Subject to any disclaimer, the term of this patent is extended or adjusted under 35 U.S.C. 154(b) by 0 days.

(21) Appl. No.: 15/308,381

(22) PCT Filed: Jun. 2, 2015

(86) PCT No.: PCT/IB2015/001792
§ 371 (c)(1),
(2) Date: Nov. 2, 2016

(87) PCT Pub. No.: WO2015/198154
PCT Pub. Date: Dec. 30, 2015

(65) Prior Publication Data
US 2017/0243527 A1    Aug. 24, 2017

Related U.S. Application Data

(60) Provisional application No. 62/006,648, filed on Jun. 2, 2014.

(51) Int. Cl.
*G09F 13/22* (2006.01)
*G09G 3/12* (2006.01)
(Continued)

(52) U.S. Cl.
CPC ........... *G09F 13/22* (2013.01); *C09K 11/025* (2013.01); *C09K 11/643* (2013.01);
(Continued)

(58) Field of Classification Search
CPC ...... G09F 13/22; G09F 13/0413; G09F 13/06; G09F 2013/0459; G09F 2013/222
See application file for complete search history.

(56) References Cited

U.S. PATENT DOCUMENTS 3,270,201 A    8/1966   Hardesty
4,201,005 A *  5/1980   Hunt .................. G09F 13/06
                                                      362/267

(Continued)

OTHER PUBLICATIONS

International Search Report dated Feb. 12, 2016, for International Application No. PCT/IB2015/001792.
(Continued)

*Primary Examiner* — Gary C Hoge
(74) *Attorney, Agent, or Firm* — FisherBroyles, LLP (57) ABSTRACT

A hybrid photoluminescent display consumes little electrical power and provides for light emission/color in a desired color. The display includes a housing having openings forming a desired legend. White LEDs internal to the housing provide light for energizing photoluminescent material. A legend panel housed within the housing defines openings corresponding to the legend. Photoluminescent material is disposed within the openings of the legend panel. The photoluminescent material is selected to be energizable by light from the white light source, and to emit light primarily in a selected wavelength range corresponding to a desired legend color. A color is filter disposed adjacent the photoluminescent material on a side of the legend panel opposite the light source. The color filter is selected to selectively transmit substantially all light in the selected wavelength range, and to selectively not transmit substantially all light outside the selected wavelength range.

20 Claims, 11 Drawing Sheets

(51) Int. Cl.
*G09G 5/02* (2006.01)
*C09K 11/02* (2006.01)
*C09K 11/64* (2006.01)
*C09K 11/77* (2006.01)
*G09F 13/04* (2006.01)
*G09F 13/06* (2006.01)
*G09F 13/18* (2006.01)
*G09G 3/20* (2006.01)

(52) U.S. Cl.
CPC ...... *C09K 11/7706* (2013.01); *G09F 13/0413* (2013.01); *G09F 13/06* (2013.01); *G09F 13/18* (2013.01); *G09G 3/12* (2013.01); *G09G 5/02* (2013.01); *G09F 2013/049* (2013.01); *G09F 2013/0418* (2013.01); *G09F 2013/0459* (2013.01); *G09F 2013/222* (2013.01); *G09G 3/2003* (2013.01); *G09G 2320/0666* (2013.01); *G09G 2380/06* (2013.01); *Y02B 20/181* (2013.01)

(56) References Cited

U.S. PATENT DOCUMENTS

| | | | |
|---|---|---|---|
| 4,420,898 A | 12/1983 | Moses | |
| 4,466,208 A | 8/1984 | Logan | |
| 5,367,806 A | 11/1994 | Hoffman | |
| 5,471,773 A | 12/1995 | Hoffman | |
| 5,497,572 A | 3/1996 | Hoffman | |
| 5,775,016 A | 7/1998 | Chien | |
| 5,961,062 A | 10/1999 | Beihl | |
| 5,988,825 A * | 11/1999 | Masters | G08B 7/062 362/20 |
| 6,299,338 B1 | 10/2001 | Levinson | |
| 6,364,498 B1 | 4/2002 | Burbank | |
| 6,457,270 B1 * | 10/2002 | Stark, III | G09F 13/04 362/812 |
| 6,487,802 B2 | 12/2002 | Suen | |
| 6,663,255 B1 | 12/2003 | Carito | |
| 6,843,010 B2 * | 1/2005 | Robinson | G09F 13/04 40/542 |
| 6,883,926 B2 | 4/2005 | Wojnarowski | |
| 7,412,790 B2 | 8/2008 | Riopel | |
| 7,430,355 B2 | 9/2008 | Heikenfeld | |
| 7,937,865 B2 | 5/2011 | Li | |
| 8,286,378 B2 | 10/2012 | Martin | |
| 8,302,336 B2 | 11/2012 | Li | |
| 8,479,423 B2 | 7/2013 | Martin | |
| 8,539,702 B2 | 9/2013 | Li | |
| 2002/0018345 A1 | 2/2002 | Seifert | |
| 2004/0128882 A1 * | 7/2004 | Glass | G09F 7/002 40/544 |
| 2004/0244247 A1 * | 12/2004 | Bolta | G09F 13/20 40/570 |
| 2005/0198879 A1 * | 9/2005 | Hannington | G08B 7/062 40/570 |
| 2006/0001037 A1 | 1/2006 | Schardt | |
| 2006/0207138 A1 | 9/2006 | Yuen | |
| 2006/0225326 A1 * | 10/2006 | Robinson | G09F 13/20 40/542 |
| 2007/0137077 A1 * | 6/2007 | Bolta | G09F 13/20 40/570 |
| 2007/0240346 A1 * | 10/2007 | Li | G09F 13/20 40/544 |
| 2010/0002414 A1 | 1/2010 | Meir | |
| 2010/0018092 A1 * | 1/2010 | Peckham | G09F 13/20 40/542 |
| 2010/0263184 A1 * | 10/2010 | Ray | G08B 7/062 29/401.1 |
| 2010/0321919 A1 | 12/2010 | Yang | |
| 2012/0102799 A1 | 5/2012 | Roberts | |
| 2012/0227296 A1 * | 9/2012 | Roberts | G09F 19/22 40/542 |
| 2013/0063951 A1 | 3/2013 | Beier | |
| 2013/0180139 A1 | 7/2013 | Underwood | |
| 2013/0199064 A1 | 8/2013 | O'Kell | |
| 2013/0291413 A1 | 11/2013 | Lifka | |
| 2014/0053437 A1 | 2/2014 | Shipman | |
| 2014/0059904 A1 | 3/2014 | Shipman | |

OTHER PUBLICATIONS

Written Opinion of the International Searching Authority dated Feb. 12, 2016, for International Application No. PCT/IB2015/001792.

* cited by examiner

HYBRID PHOTOLUMINESCENT LIGHTING DISPLAY

CROSS-REFERENCE TO RELATED APPLICATION

This application is a national stage application of International Application No. PCT/162015/001792, filed Jun. 2, 2015, which claims the benefit of priority, under 35 U.S.C. § 119(e), of U.S. Provisional Patent Application No. 62/006,648, filed Jun. 2, 2014, the entire disclosure of each of which is hereby incorporated herein by reference.

FIELD OF THE INVENTION

The present invention relates generally to illuminated displays, and more particularly to an illuminated display having illumination components providing multiple modes of efficient illuminated operation with enhanced performance in a selected band of the visible light spectrum.

BACKGROUND OF THE INVENTION

As used herein, the term "display" is intended to broadly encompass any informational, pictorial or graphic displays, e.g., containing alphabetic and/or numeric text, graphic components, icons, symbols or other visually discernable indicia. These displays may be used in various contexts as signs, panels or any other visual display. One specific and non-limiting example of such a display is a fixed-image sign for emergency lighting purposes, such as an EXIT sign used to indicate an exit or egress path from a building in the context of commercial building construction. Other examples include informational displays in a variety of other locations and/or contexts different from emergency lighting, such as displays indicated "LASER IN USE," "AREA OF RESCUE ASSISTANCE," "MRI ON," or "ON THE AIR."

In the specific context of signs for emergency lighting, building codes, transportation safety codes, and/or other regulations require such signs to be plainly visible and to be illuminated at all times when a building is occupied.

Certain emergency lighting signs include internal energy/light sources powered by building/mains power. With respect to common incandescent, neon, and fluorescent light sources, such essentially continuous illumination is expensive and inefficient.

Standard photoluminescent emergency lighting signs are commonly available that do not contain an internal energy source, but require a continuous source of ambient light to provide adequate activation when building/mains power is available. This is typically provided from a lighting fixture mounted in close proximity to the photoluminescent exit sign, which in many cases requires a costly and high power consuming installation primarily required to activate the emergency lighting sign as well as periodic maintenance to ensure adequate activation.

Such ambient light-based systems are susceptible to downtime due to power failures in the electrical power grid. To provide illumination in the event of building power failure, some hybrid signs have been developed to provide multiple illumination modes. Such hybrid photoluminescent signs typically consist of a code-approved legend illuminated by an internal energy source that provides required illumination for a means of egress from an internal source when building/mains power is available, and from an after-glow from photoluminescent material that has been activated from said internal source after mains power becomes unavailable.

U.S. Pat. Nos. 6,364,498, 6,843,010 and 7,412,790 disclose exemplary signs with multiple illumination modes. For example, U.S. Pat. No. 6,364,498 discloses a sign that uses a powered light source to illuminate lettering/characters and to energize photo-luminescent pigment during normal operation. The pigment glows and thereby illuminates the lettering in the event of a power failure.

Alternatively, some signs have been developed to include battery backup systems. However, battery backup systems have several limitations and/or disadvantages, including that they consume power essentially all of the time, which is still further expensive and inefficient. In addition, batteries have limited lives, and thus require periodic testing of the sign and frequent battery replacement, which has a resulting adverse environmental impact.

To address the inefficiency of battery backup systems and/or signs with incandescent or other light sources, some energy efficient signs have been developed that use energy-efficient LEDs as the light source. U.S. Pat. Nos. 7,937,865, 8,302,336, 8,539,702, and 6,883,926 disclose exemplary signs using LEDs as a light source.

Unlike energy inefficient incandescent, neon and fluorescent light sources that produce white (broad visible spectrum) light, many energy-efficient LEDs do not generate white light. In the context of exit signs, the desired color is most often red (625 nm) or green (520 nm). Though energy-efficient, many LEDs are objectionable in that provide undesirably low radiative performance in the desired color spectrum, and/or undesirably high radiative performance outside the desired color spectrum.

What is needed is an illuminated display comprising having illumination components providing multiple modes of efficient illuminated operation, while also provide enhanced radiative performance in a selected band of the visible light spectrum, such as the red or green spectrum for emergency lighting signs.

SUMMARY

The present invention provides a hybrid photoluminescent display that consumes very low electrical power, e.g., approximately 0.5 watts, and also provides activation of internal photoluminescent material during the period when mains power is available, thereby not require a source of ambient light. In addition, the present invention allows for use of white LEDs while also providing for a legend color in a desired color/wavelength range. In the context of exit signs, the present invention can provide red or green light emission, as is commonly used in exit signs, along with a high contrast ratio against the housing face, when the sign is unpowered and viewed by ambient light.

In one exemplary embodiment a hybrid photoluminescent display for displaying a visually-perceptible legend in a desired legend color includes an outer housing comprising first and second shells constructed of an optically opaque material. The shells are matable to define an enclosure. At least one of the first and second shells defines a plurality of openings collectively forming the legend. Each shell has a respective inner surface, and the outer housing defines at least one rib.

A light source comprising a plurality of white light emitting diodes (LEDs) is configured to emit white light across a broad wavelength spectrum when energized by an electrical power source.

A legend panel is dimensioned for receipt within the outer housing. The legend panel comprises a rigid substantially planar member of a first material. The planar member defines a plurality of openings corresponding to the plurality of openings in the outer housing that collectively form the legend. The plurality of openings are positioned to align with the openings when the legend panel is captured within the outer housing between the rib and the respective inner surface of the shell(s).

Photoluminescent material is disposed within each of the plurality of openings of the planar member to provide a substantially planar and continuous legend panel. The photoluminescent material is selected to be energized by light from the white light source, and to emit light primarily in a selected wavelength range corresponding to a desired legend color.

A color filter is disposed adjacent the photoluminescent material opposite the light source. The color filter is selected to selectively transmit substantially all light in the selected wavelength range, and to selectively not transmit substantially all light outside the selected wavelength range.

BRIEF DESCRIPTION OF THE DRAWINGS

The present invention will now be described by way of example with reference to the following drawings in which.

DETAILED DESCRIPTION

A hybrid photoluminescent display is discussed in the context of an exemplary exit sign suitable for use as emergency lighting in building construction applications. It should be noted that this discussion in the context of emergency lighting, and in particular as an exit sign, is for non-limiting illustrative purposes only. The inventive display may have any suitable configuration for any suitable application, context, or environment.

Figure 1:
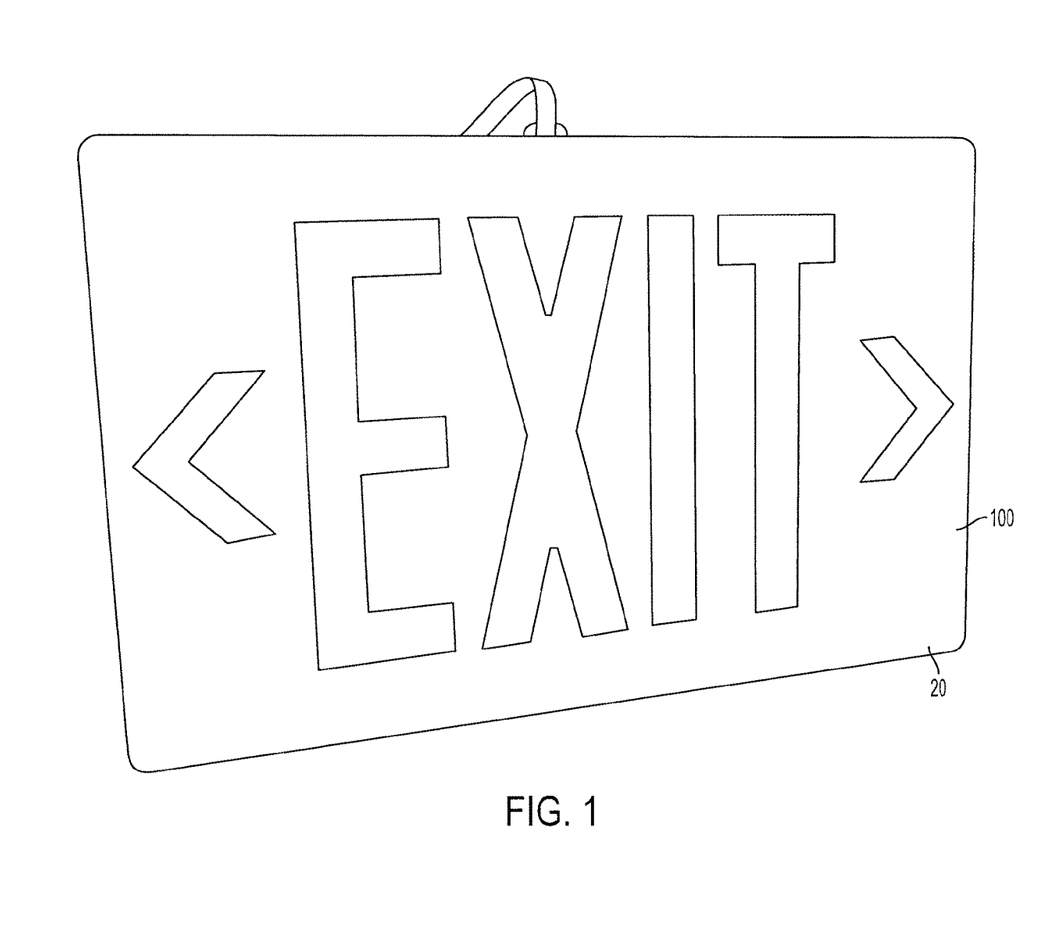
FIG. 1 is a front elevational view of an exit sign in accordance with an exemplary embodiment of the present invention.
Figure 2:
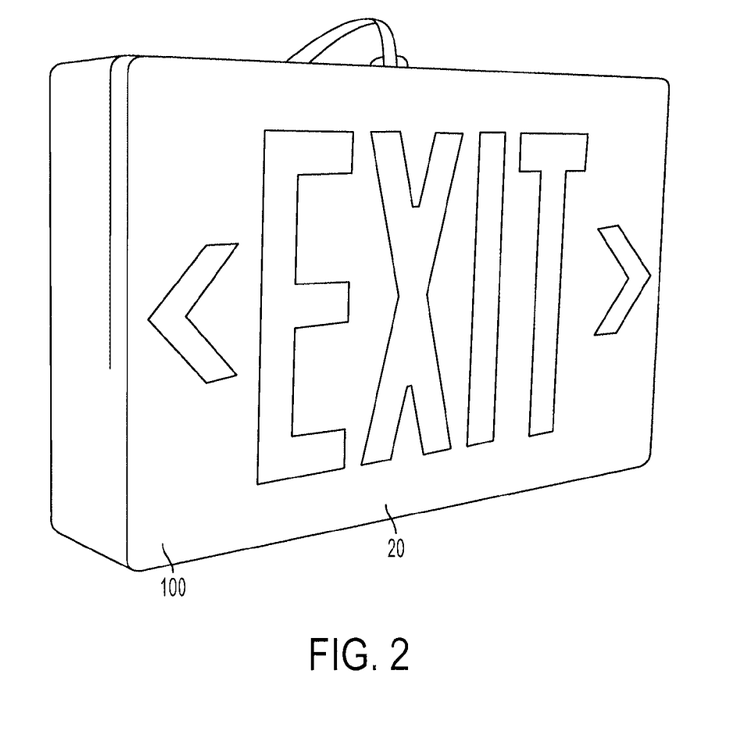
FIG. 2 is a front perspective view of the exit sign of FIG. 1.
Figure 3:
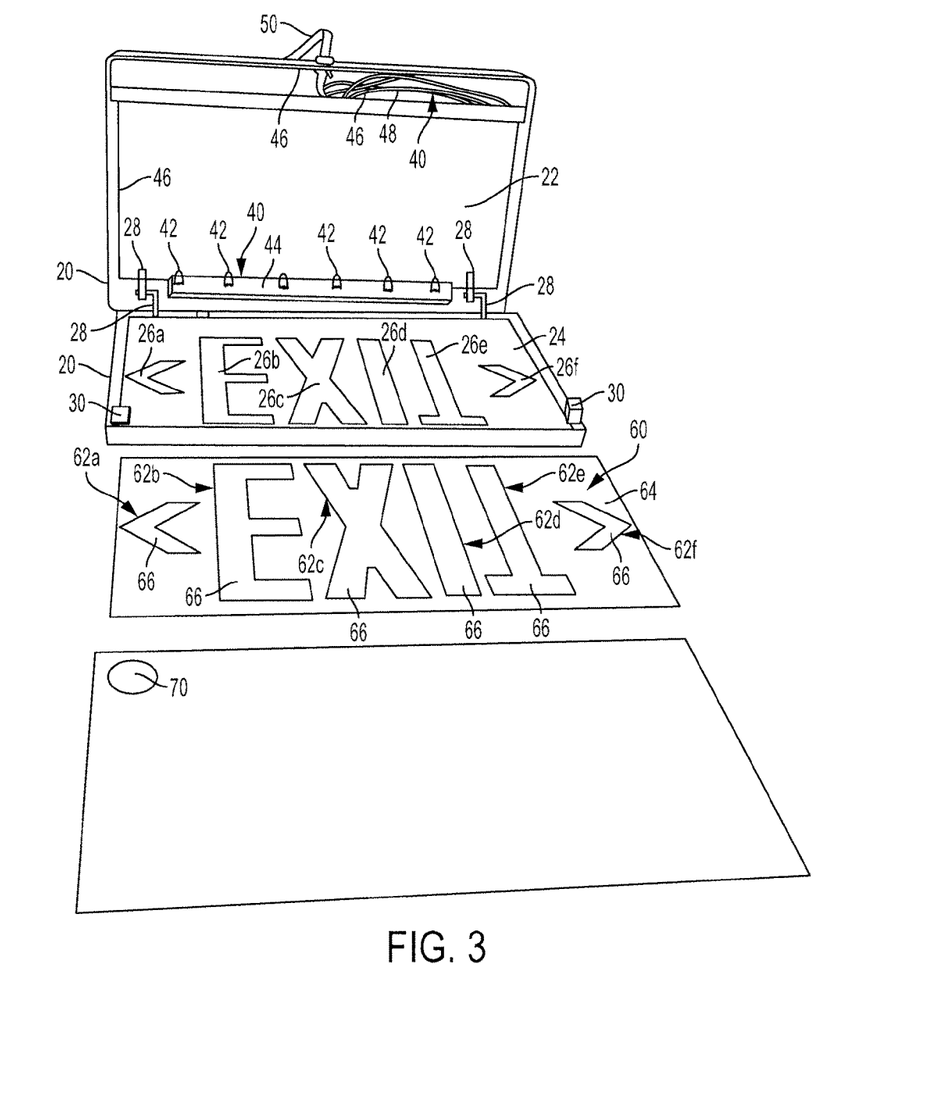
FIG. 3 is a front view of the components of the exit sign of FIG. 1.

Referring now to FIGS. 1-7, the exemplary display sign 100 includes an outer housing 20, an LED light source, 40, a legend panel 60, and a color filter 70, as best shown in FIGS. 1-3.

As best shown in FIGS. 2 and 3, the outer housing 20 is constructed of an optically opaque material, and includes separate shells matable to one another to form a substantially-enclosed outer housing 20. By way of example, the housing may be molded from a die cast aluminum or a flame retarding (class I) polymeric material such as, but not limited to, polycarbonate, or ABS.

In the exemplary embodiment, the outer housing 20 includes a rear shell 22 matable to a front shell 24. A portion of the outer housing, in this case the front shell 24, is configured to define a plurality of openings that collectively define or otherwise form the intended visually perceptible legend of the sign 100. In this exemplary sign, the openings 26a, 26b, 26c, 26d, 26e, 26f collectively form a legend including the word EXIT and a pair of chevron-shaped graphical elements. However, it should be appreciated that any suitable configuration of one or more openings may be used to provide the desired legend in accordance with the present invention.

Figure 5:
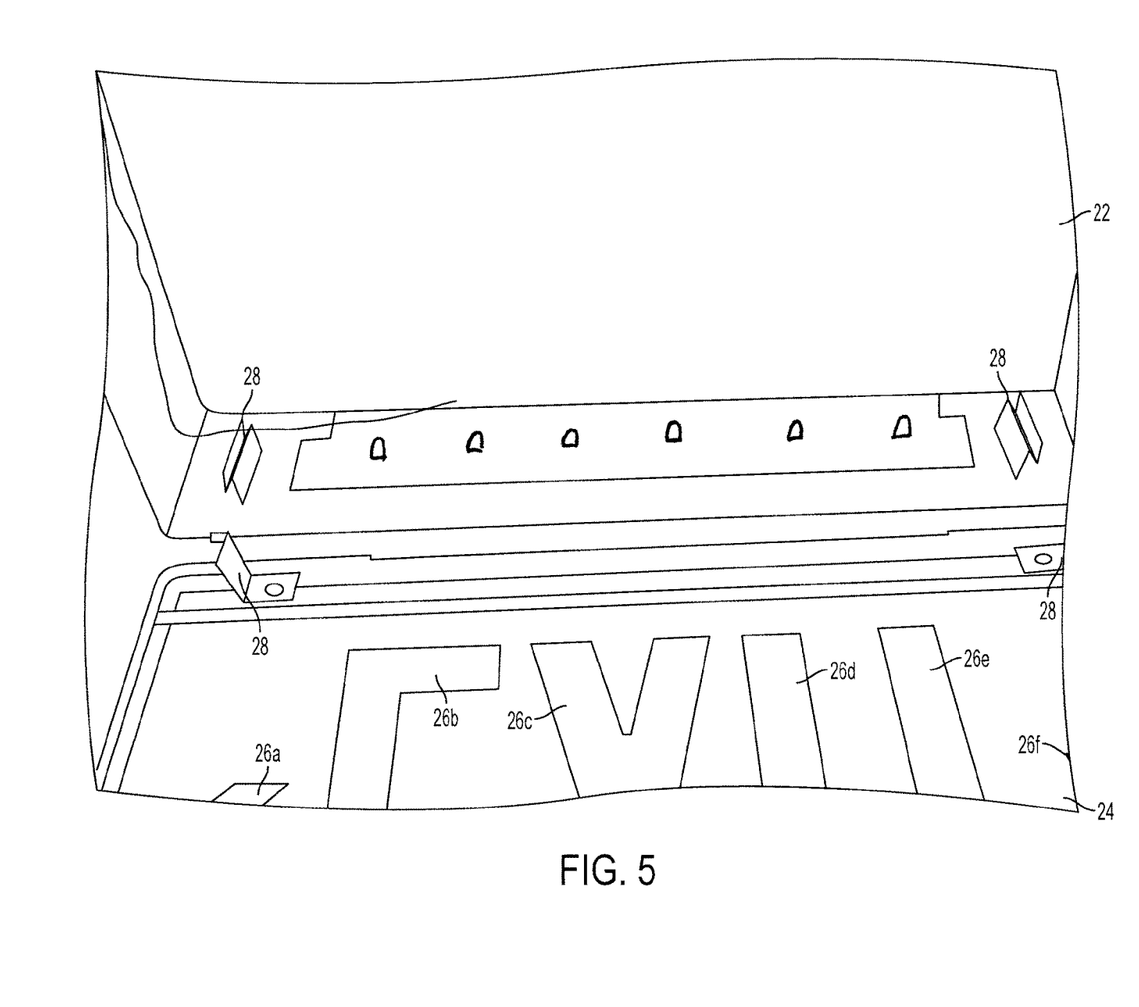
FIG. 5 is an enlarged view of an interior portion of an enclosure of the exit sign of FIG. 1.

Further, in this exemplary embodiment, the housing 20 includes hinge members 28 pivotably interconnecting the rear and front shells 22, 24, as best shown in FIGS. 3 and 5, so that the shells can pivot between an open position (similar to that shown in FIGS. 3 and 5, and a closed position in which the shells 22 and 24 abut one another to form the substantially-enclosed outer housing, as shown in FIGS. 1 and 2.

Further, in this exemplary embodiment, the housing 20 further includes catch members 30. The catch members 30 are configured to releasably retain the front and rear shells 22, 24 in the closed position. In this exemplary sign, each catch member 30 is comprised of a resiliently deflectable body that is configured to abut, deflect, and ride over a projection of the mating shell, and then to resile to cause the body to interfere with the projection and thereby retain the shells 22, 24 in the closed position.

The housing 20 is further configured to support the light source 40. In accordance with the present invention, light source 40 comprises one or more white light emitting diodes ("LEDs") 42, which are selected for both their energy efficiency and their admission of a broad spectrum of visible light, i.e., "white" light. As is well-known in the art, white LEDs include photoluminescent material that absorbs a portion of the radiation emitted by the LED and re-emits radiation of a different color (wavelength), so that the light emitted by the LED and re-emitted by the photoluminescent material collectively provide a combination of blue, red, green, and yellow light, which in combination provides "white" (broad visible light spectrum) light, that generally appears to the human eye as being "white." The light source preferably includes a plurality of individual white LEDs 42 physically supported in roughly-equal spaced relationship on a substrate 44 that is in turn mounted on bosses or other supports 32 of the housing, as best shown in FIGS. 3 and 5. Preferably, the substrate 44 is supported along one of the long sides of a rectangular housing 20. The light source further includes electrical wiring 46, an electronic driver circuit 48 for supplying appropriate current and/or voltage to the LED's, and or other components necessary to cause illumination of the LEDs when the light source is connected to and receiving electrical power from a building's AC or other electrical power system. Accordingly, the display/sign also includes an electrical conductor 50 operably connected to the light source and extending outwardly of the housing.

Figure 4:
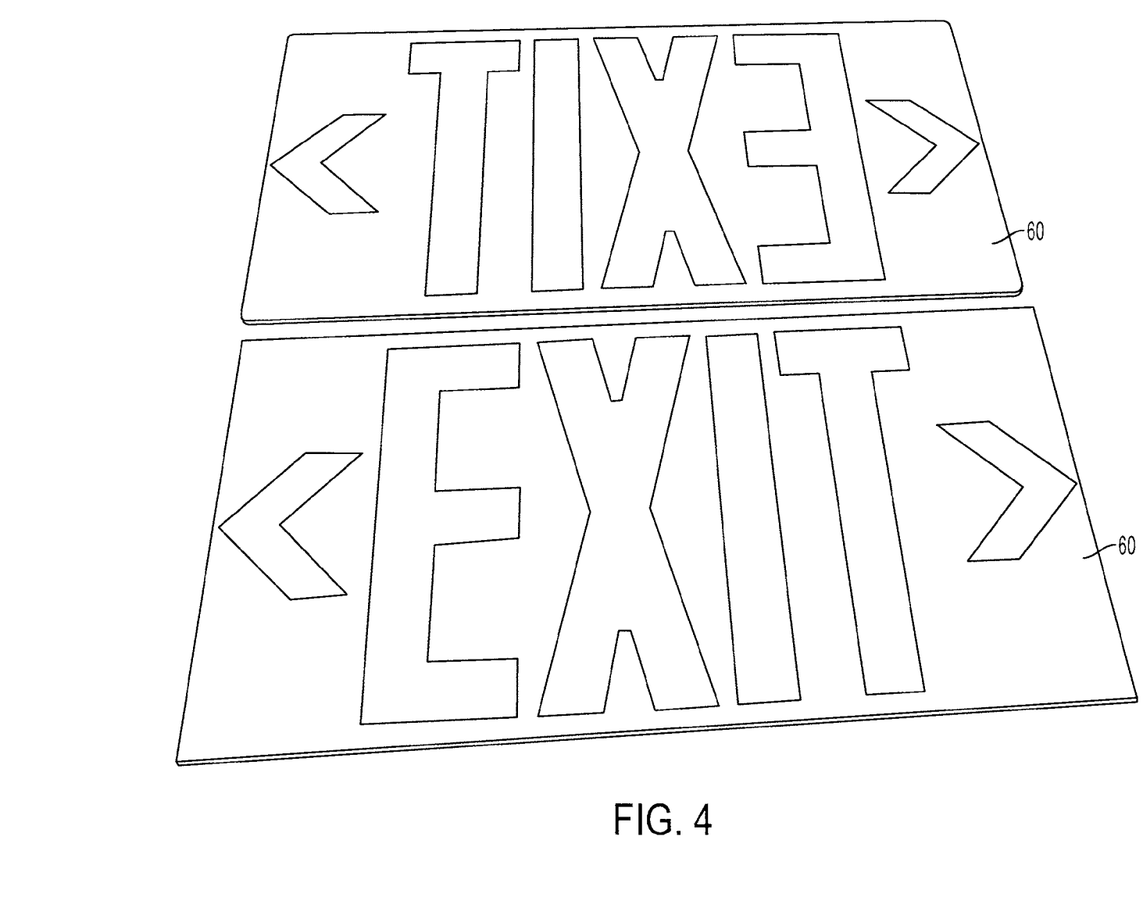
FIG. 4 is a top view showing a legend template including cast luminescent material.
Figure 6:
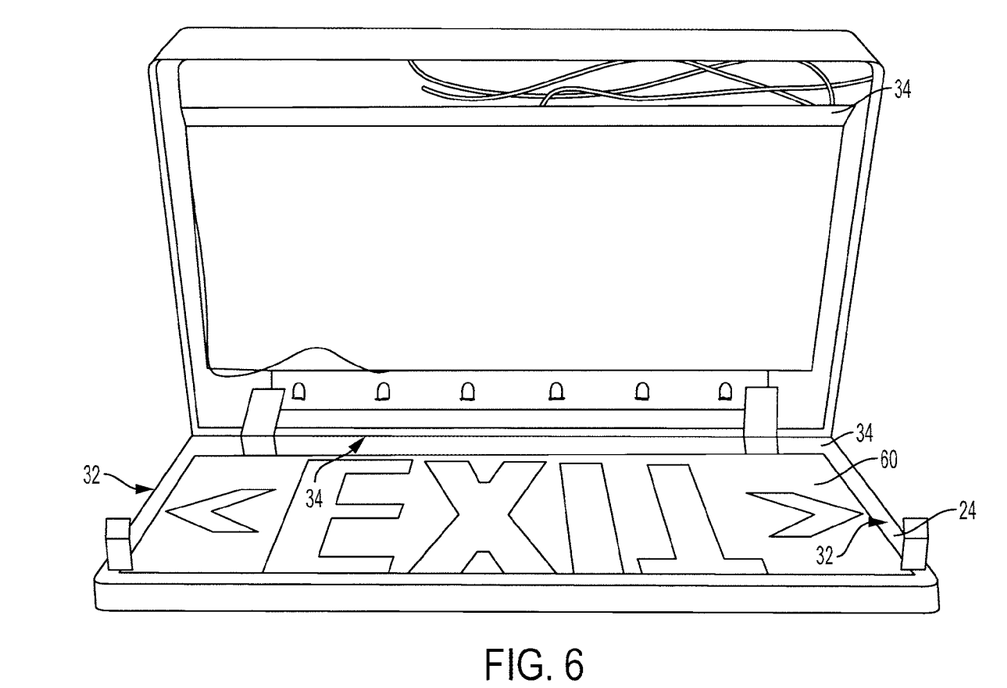
FIG. 6 is a front view of the components of the exit sign of FIG. 1, showing the color filter and legend panel assembled to the front shell 24.

Referring now to FIGS. 3 and 4, the exemplary display 100 further includes a legend panel 60. Legend panel 60 is a substantially flat/planar member, constructed of a rigid sheet 64 such as a polycarbonate, ABS, or acrylic, that is configured to define a plurality of openings 62a, 62b, 62c, 62d, 62e, 62f, each of which is configured, sized and positioned to correspond to the openings in the housing. By way of example, the panel may be molded or machined to include such openings. Accordingly, in this example, the plurality of openings collectively forms a legend including the word EXIT and a pair of chevron-shaped graphical elements. Preferably, the openings in the rigid sheet 64 are as large as or larger than the openings in the housing, so as to be coextensive with (or larger than) the openings in the housing. Within these openings is provided photoluminescent material, e.g., via a casting or molding process, to provide corresponding photoluminescent characters 66. Accordingly, the legend panel 60 is substantially planar and continuous, as will be appreciated from the front and rear sides of the legend panel, two legend panels being shown in FIG. 4. A legend panel 60 is dimensioned to be received within the outer housing 20, and to abut support structures consisting of side walls 32 and ribs 34 within the outer housing such that when the shells of the outer housing are in the closed position, legend panel 60 is captured and fixedly supported between the shells 22, 24, as will best appreciated from FIG. 6. Thus, the legend panel 60 is mountable in the outer housing 20 with the photo-luminescent character(s) disposed adjacent to an inner surface of the first front shell 24. FIG. 6 is a front view of the components of the exit sign of FIG. 1, showing the legend panel 60 assembled to the front shell 24.

Any suitable photoluminescent material may be selected for this purpose. However, it is preferable to select a photoluminescent material that will emit light in a wavelength range corresponding to the light desired to be emitted from the sign. In the context of exit signs, red and green light emission from the sign is often preferred. In this example, green light emission from the exemplary exit sign green is preferred.

Figure 9:
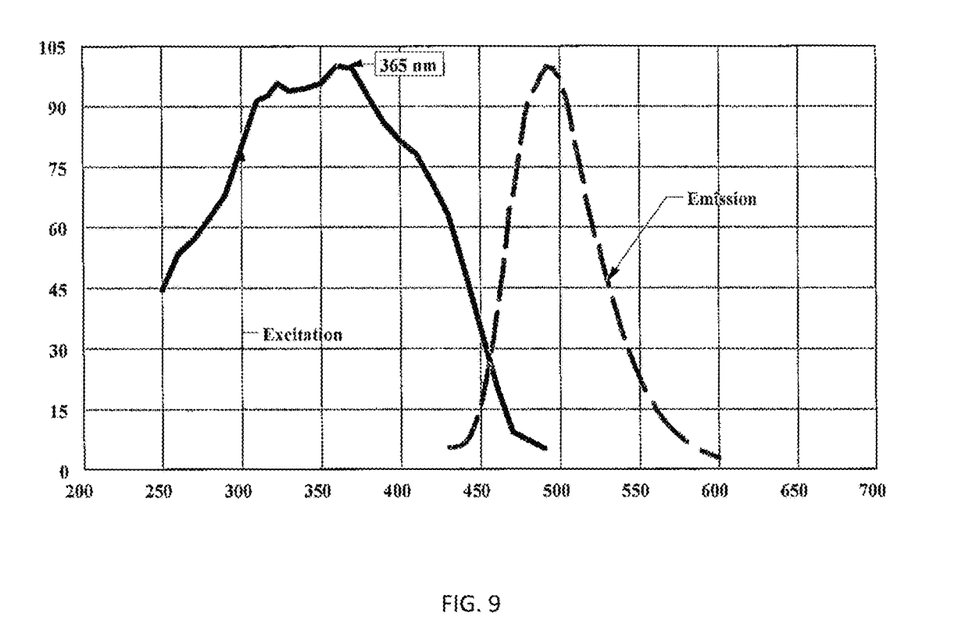
FIG. 9 is a chart showing excitation and emission spectra of an exemplary strontium aluminate photoluminescent material.

Many current photoluminescent exit signs use strontium aluminate photoluminescent material, which typically has excitation and emission spectra as shown in FIG. 9.

InGaN LEDs with YAG phosphors are commonly available to produce white light, and are a preferred choice for exciting this photoluminescent material. These LEDs are generally energy-efficient, have a lifetime in excess of 50,000 hours, include useful areas of the spectrum for this application, and do not produce UV radiation in the range damaging to humans and/or polymer materials.

Figure 10:
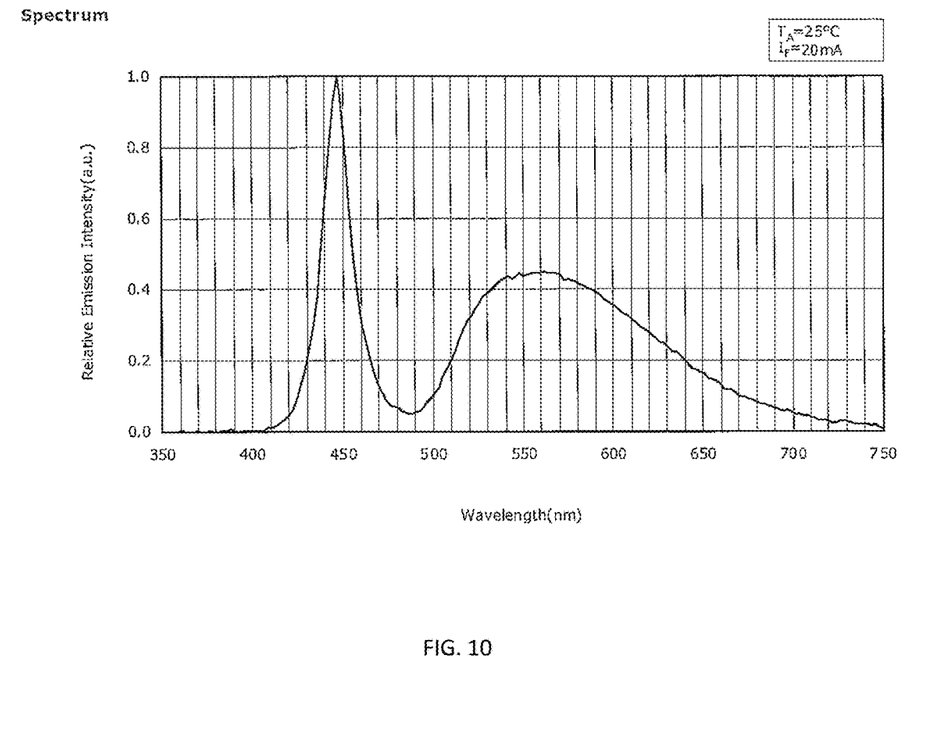
FIG. 10 is a chart showing spectral characteristics associated with an exemplary InGaN LED.

The spectral characteristic shown in FIG. 10 is associated with an exemplary InGaN LED that is suitable for this application lean In this example, the peak Relative Emission Intensity of 450 nm provides an efficient source for providing excitation for the strontium aluminate photoluminescent material. In addition, there is adequate emission in range of visible green (520 nm) to provide desirable green legend color while mains power is available.

However, utilization of InGaN LEDs with YAG phosphors as the light source, without correction, provides undesirable effects for sign for which green light emission is desired. Particularly, with building power available, the 450 nm energy, while efficiently activating the strontium aluminate photoluminescent material, also bleeds through the photoluminescent material, creating a "royal blue" color effect to light emitted from/through the legend panel, and thus the display sign, which is undesirable when the desired sign color is green.

In addition, the 600 nm energy and above, also bleeds through the photoluminescent material, creating yellow and red color effects to light emitted from/through the legend panel, and thus the display sign, which is undesirable when the desired sign color is green.

Accordingly, in accordance with the present invention, the display 100 further includes a color filter 70, as best shown in FIG. 3. The color filter is selected to provide specific spectral energy transmittance characteristics to selectively block/absorb light outside the desired color range, and to selectively transmit light within the desired color range.

In one embodiment, the color filter 70 is a separate polycarbonate or polyester film produced by co-extruding or surface coating with appropriate dyes, or screen printing with transparent color pigments. In the assembled sign, the color filter is sandwiched between the legend panel 60 and the portion of the outer housing 20 including the openings providing the legend, and thus is captured and supported therebetween.

In an alternative embodiment, the color filter 70 comprises a layer of transparent pigment, having the appropriate spectral characteristics, applied to the surface of the legend panel 60, in particular, over the photoluminescent material/characters. By way of example, this layer of transparent pigment may be applied by a screen printing process, though any suitable process may be used. In either case, the color filter 70 is positioned on a side of the legend panel 60 opposite the light source 40.

Figure 7:
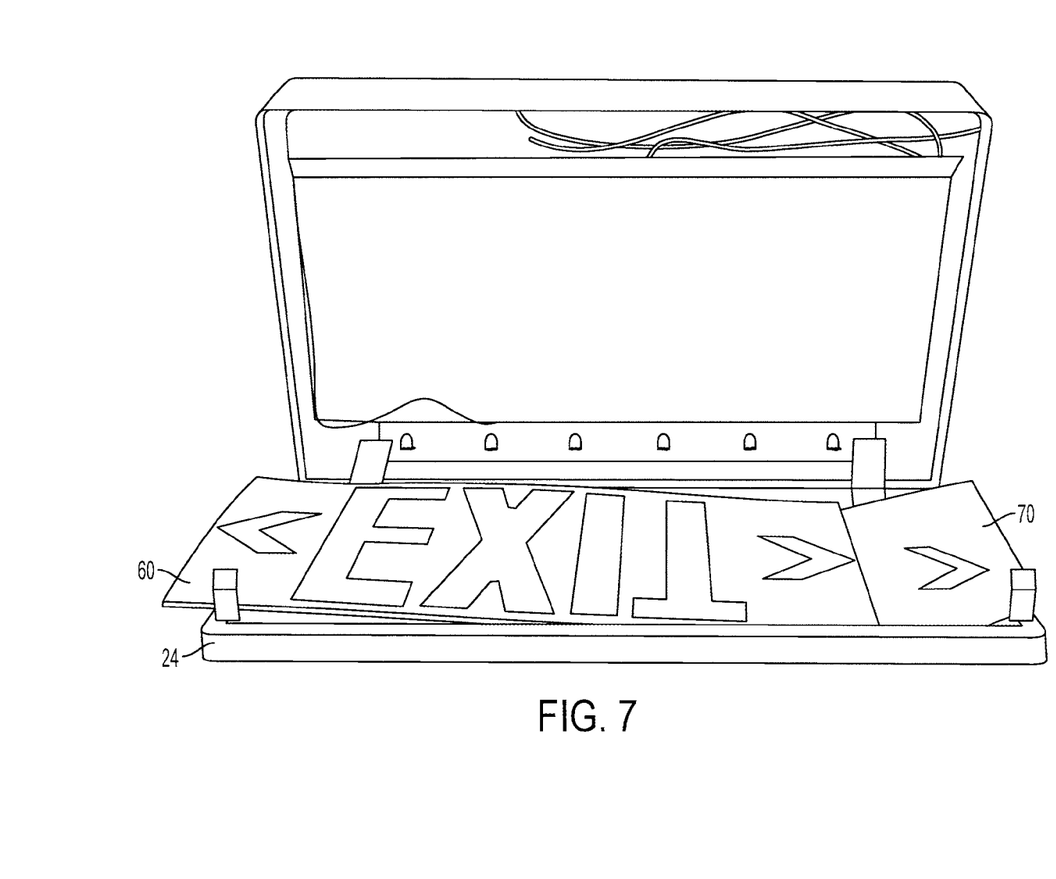
FIG. 7 is a front view of the components of the exit sign of FIG. 1, showing the color filter and legend panel partially assembled from the front shell 24.

FIG. 7 is a front view of the components of the exemplary exit sign of FIG. 1 shown partially disassembled to show the color filter 70 between the legend panel 60 and front shell 24.

In the context of the exemplary exit sign discussed above that employs InGaN LEDs with YAG phosphors as the light source and strontium aluminate as the photoluminescent material in the legend panel 60, and for which green light emission is desired from the sign, it is therefore desirable to block both the 450 nm energy (blue) and below, and the 600 nm and above (yellow and red energy) from exiting the photoluminescent legend panel 60, and also to allow emission of 500 nm energy (green) from the photoluminescent legend panel 60, to provide for an essentially green light emission from the sign.

Accordingly, a color filter 70 may be used having the desired specific spectral energy transmittance characteristics. For example, polycarbonate color filters in thin film form are commercially available from Lee Filters USA of Burbank, Calif. that provides various spectral energy transmittance characteristics. For the particular example discussed herein, Lee Filters' polycarbonate color filter no. 122 is appropriate and provides the specific spectral energy transmittance characteristics shown in FIG. 11.

Figure 11:
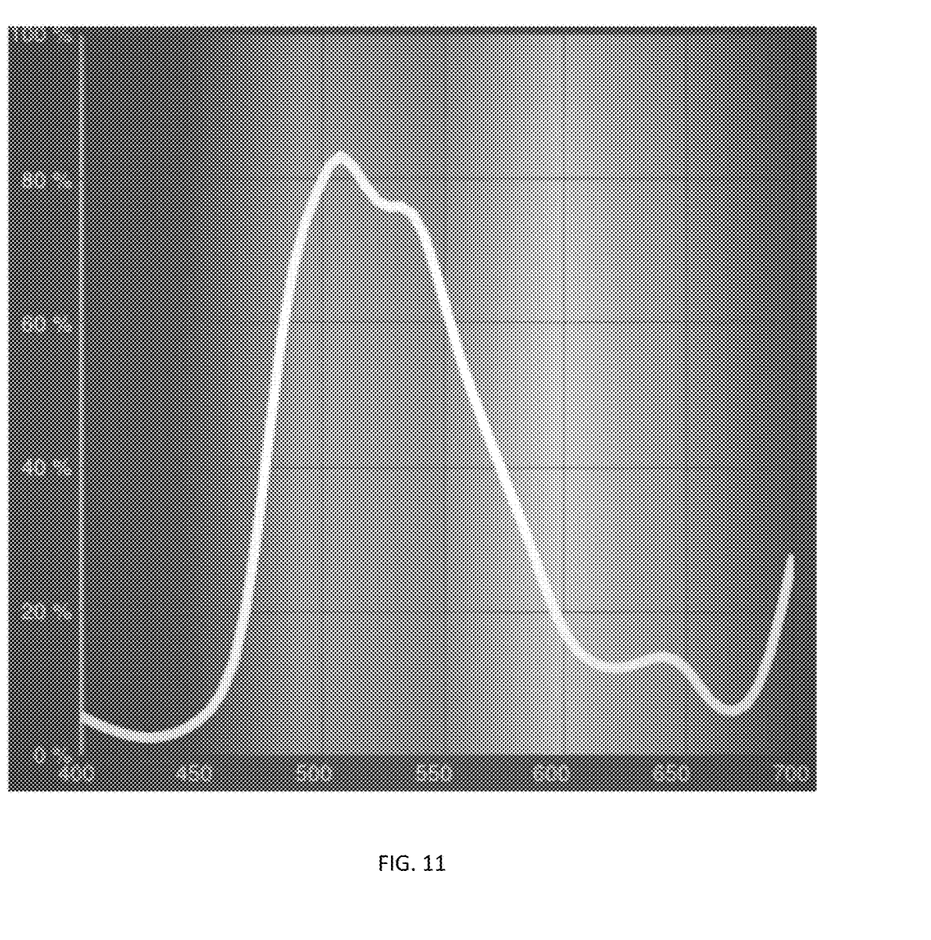
FIG. 11 is a chart showing specific spectral energy transmittance characteristics for an exemplary color filter.

Accordingly, for this exemplary color filter 70, the transmittance at 450 nm (blue) is approximately less than 5% thereby attenuating the peak "royal blue" energy viewed from the face of the sign. Further, the transmittance at 600 nm and above (yellow/red) is approximately an average of about 10% thereby attenuating the yellow and red energy viewed from the face of the sign. Further, the transmittance at 500 nm is approximately 80%, thereby causing just a modest loss of green energy emission of the photoluminescent material when viewed from the face of the sign.

When viewed by white reflected ambient light, and powered from mains, these characteristics produce the desired dark green (in this example) color to the legend, which is preferred in exit signs. Further, this exemplary arrangement provides a high contrast ratio against a light-colored/white-colored outer housing, even when building power is available, and under ambient light conditions.

It will be appreciated that different photoluminescent materials in the legend panel 60 and different color filters with different spectral energy transmittance characteristics can be combined with the use of white LEDs to provide for other signs having other desired emission wavelength ranges—e.g., to provide essentially blue, yellow, red, etc. displays.

When assembled, the display 100 includes the legend panel 60 and color filter 70 supported within the outer housing 20, namely, between the rear shell 22 and light source 40, and the shell 24.

Figure 8:
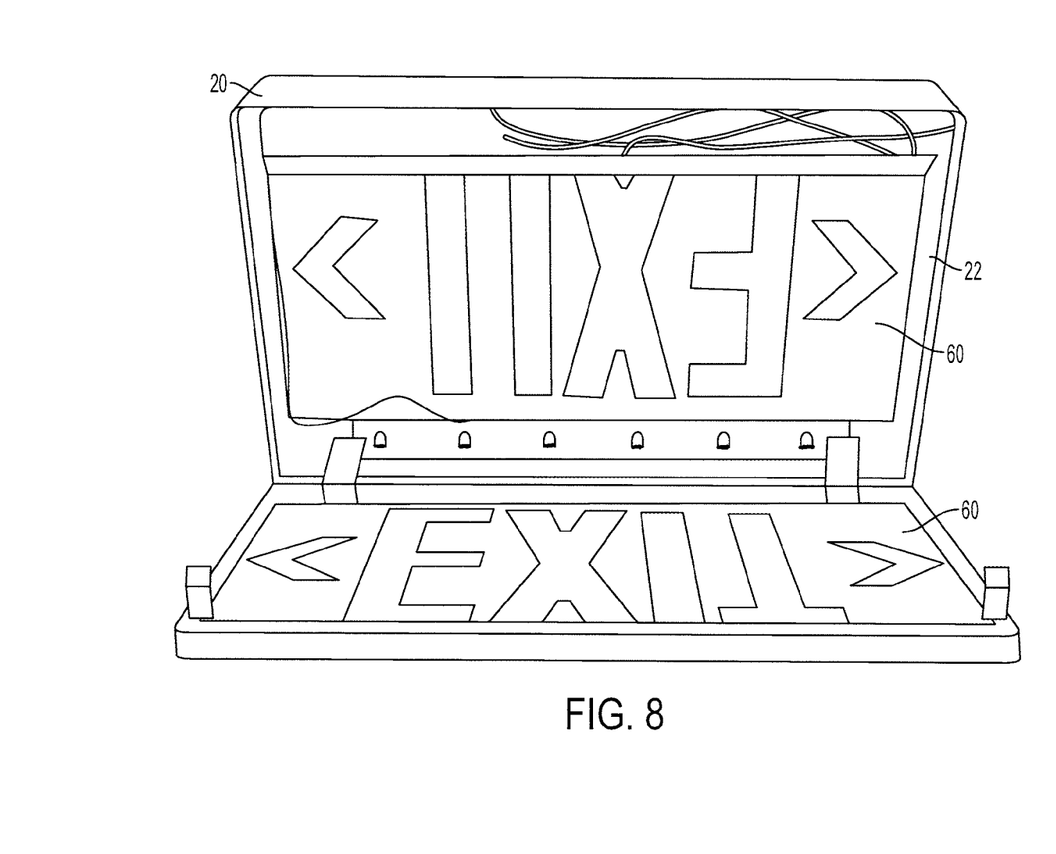
FIG. 8 is a front view of the components of an alternative exit sign that is similar to that of FIG. 1, but showing an alternative housing having a double-face construction in which both the front and rear shells including openings for displaying a legend, and in which the sign further includes a second legend panel and color filter assembled to the rear shell 22.

FIG. 8 is a front view of the components of an alternative exit sign that is similar to that of FIG. 1, but showing an alternative housing 20 having a double-face construction in which both the front and rear shells 22, 24 include openings (similar to those shown above in reference to the front shell) for displaying a legend, and in which the sign further includes a second legend panel and color filter assembled to the rear shell 22 in a manner similar to that described above with reference to the front shell. Accordingly, the sign's legend is visible from the front and back of the display.

In operation, when building/mains power is available, white light emitted by the energy-efficient white LEDs irradiates the photoluminescent material of the legend panel 60, causing excitation of the photoluminescent material and emission of light from the photoluminescent material of the legend panel 60. In this example, the photoluminescent material emits green light as well as white light from the LEDs that has bled through the photoluminescent material. This white/broad visible spectrum light emitted from the legend panel 60 then passes through the color filter 70, which is selected to transmit only light of a desired color, blocking/absorbing undesirable royal blue, yellow and red radiation from the LEDs, resulting in visible green color which is preferred in exit signs, without reducing the effectiveness of activating the photoluminescent material by the radiation of the LEDs. When building/mains power is not available, the display further provides an afterglow in the desired color rage from photoluminescent material that has been activated by the LEDs during normal operation.

While the invention has been particularly shown and described with reference to a preferred embodiment, it will be understood by those skilled in the art that various changes in form and detail may be made therein without departing from the spirit and scope of the invention. While there have been described herein the principles of the invention, it is to be understood by those skilled in the art that this description is made only by way of example and not as a limitation to the scope of the invention, and that various changes in detail may be effected therein without departing from the spirit and scope of the invention as defined by the claims.

What is claimed is:

1. A hybrid photoluminescent display for displaying a visually-perceptible legend in a desired legend color, the display comprising:
   an outer housing comprising first and second shells constructed of an optically opaque material, said shells being matable to define an enclosure, at least one of said first and second shells defining a first plurality of openings collectively forming the legend, each shell having a respective inner surface, said outer housing defining at least one rib;
   a light source comprising a plurality of white light emitting diodes (LEDs) configured to emit white light across a broad wavelength spectrum when energized by an electrical power source;
   a legend panel dimensioned for receipt within the outer housing, said legend panel comprising:
      a rigid substantially planar member of a first material, said planar member defining a second plurality of openings corresponding to said first plurality of openings in said outer housing that collectively form the legend, said second plurality of openings being positioned to align with said first plurality of openings when said legend panel is captured within said outer housing between said at least one rib and the respective inner surface of one of said shells; and
      photoluminescent material disposed within each of said second plurality of openings of said planar member to provide a substantially planar and continuous legend panel, said photoluminescent material being selected to be energized by light from said white light source, and to emit light primarily in a selected wavelength range corresponding to a desired legend color; and
   a color filter disposed adjacent the photoluminescent material opposite the light source, said color filter being selected to selectively transmit substantially all light in the selected wavelength range, and to selectively not transmit substantially all light outside the selected wavelength range.

2. The hybrid photoluminescent display of claim 1, wherein said white LEDs comprise InGaN LEDs with YAG phosphors.

3. The hybrid photoluminescent display of claim 2, wherein said photoluminescent material comprises strontium aluminate.

4. The hybrid photoluminescent display of claim 1, wherein said outer housing further comprises hinge members pivotably interconnecting said first and second shells for pivotable motion between open and closed positions.

5. The hybrid photoluminescent display of claim 4, wherein said outer housing further comprises at least one catch member configured to releasably retain said shells in the closed position.

6. The hybrid photoluminescent display of claim 5, wherein one of said first and second shells comprises a projection, and another of said first and second shells comprises said at least one catch member, said at least one catch member comprising a resiliently deflectable body that is configured to ride over said projection and then resile to interfere with said projection during movement of said shells to said closed position.

7. The hybrid photoluminescent display of claim 1, wherein said white LEDs are physically supported in equal spaced relationship on a substrate.

8. The hybrid photoluminescent display of claim 7, wherein said outer housing comprises a plurality of supports, and said substrate is fixedly mounted to said plurality of supports.

9. The hybrid photoluminescent display of claim 1, wherein said photoluminescent material is provided within said openings of said legend panel by one of a casting process and a molding process.

10. The hybrid photoluminescent display of claim 1, wherein said color filter comprises a thin film dimensioned for receipt within said outer housing between said legend panel and the respective inner surface of one of said shells.

11. The hybrid photoluminescent display of claim 1, wherein said color filter comprises a layer of transparent pigment applied on a surface of said legend panel.

12. A hybrid photoluminescent display for displaying a visually-perceptible legend in a desired legend color, the display comprising:
   an outer housing comprising first and second shells constructed of an optically opaque material, said shells being matable to define an enclosure, at least one of said first and second shells defining a plurality of openings collectively forming the legend, each shell having a respective inner surface;
   a light source;
   a legend panel dimensioned for receipt within the outer housing, said legend panel comprising:
      a rigid substantially planar member of a first material, said planar member defining a plurality of openings corresponding to said plurality of openings in said outer housing that collectively form the legend, said plurality of openings being positioned to align with said openings when said legend panel is captured within at least one of said shells; and
      photoluminescent material disposed within each of said plurality of openings of said planar member to provide a substantially planar and continuous legend panel, said photoluminescent material being selected to be energized by light from said white light source, and to emit light primarily in a selected wavelength range corresponding to a desired legend color; and
   a color filter disposed adjacent the photoluminescent material opposite the light source, said color filter transmitting light predominantly in the selected wavelength range.

13. The hybrid photoluminescent display of claim 12, wherein said light source comprises InGaN LEDs with YAG phosphors.

14. The hybrid photoluminescent display of claim 13, wherein said photoluminescent material comprises strontium aluminate.

15. The hybrid photoluminescent display of claim 12, wherein said LEDs are physically supported in equal spaced relationship on a substrate.

16. The hybrid photoluminescent display of claim 12, wherein said outer housing further comprises hinge members pivotably interconnecting said first and second shells for pivotable motion between open and closed positions.

17. The hybrid photoluminescent display of claim 12, wherein said photoluminescent material is provided within said openings of said legend panel by one of a casting process and a molding process.

18. The hybrid photoluminescent display of claim 12, wherein said color filter comprises a thin film dimensioned for receipt within said outer housing between said legend panel and the respective inner surface of one of said shells.

19. The hybrid photoluminescent display of claim 12, wherein said color filter comprises a layer of transparent pigment applied on a surface of said legend panel.

20. A hybrid photoluminescent display for displaying a visually-perceptible legend in a desired legend color, the display comprising:
   an outer housing comprising first and second shells constructed of an optically opaque material, said shells being matable to define an enclosure, at least one of said first and second shells defining a plurality of openings collectively forming the legend, each shell having a respective inner surface;
   a light source emitting light in one of a red wavelength range and a green wavelength range, and in at least one wavelength range other than the red wavelength range and the green wavelength range;
   a legend panel dimensioned for receipt within the outer housing, said legend panel comprising photoluminescent material in a location position to be aligned with said openings when said legend panel is captured within said outer housing, said photoluminescent material being selected to emit light primarily in a selected one of the red wavelength range and the green wavelength range, corresponding to a desired legend color; and
   a color filter disposed adjacent the photoluminescent material opposite the light source, said color filter blocking light in the at least one wavelength range and transmitting light predominantly in the selected wavelength range.

* * * * *